US009515460B1

(12) United States Patent
Moghal et al.

(10) Patent No.: US 9,515,460 B1
(45) Date of Patent: Dec. 6, 2016

(54) STREETLIGHT BASE

(71) Applicants: Khurram Zeshan Moghal, Senoia, GA (US); Jean Sundin, New York, NY (US); Enrique Peiniger, New York, NY (US)

(72) Inventors: Khurram Zeshan Moghal, Senoia, GA (US); Jean Sundin, New York, NY (US); Enrique Peiniger, New York, NY (US)

(73) Assignees: Cooper Technologies Company, Houston, TX (US); OFFICE FOR VISUAL INTERACTION, INC., New York, NY (US)

( * ) Notice: Subject to any disclaimer, the term of this patent is extended or adjusted under 35 U.S.C. 154(b) by 301 days.

(21) Appl. No.: 14/259,744

(22) Filed: Apr. 23, 2014

Related U.S. Application Data

(60) Provisional application No. 61/828,927, filed on May 30, 2013.

(51) Int. Cl.
*H02G 3/08* (2006.01)
*H02B 1/50* (2006.01)
*F21W 131/103* (2006.01)

(52) U.S. Cl.
CPC .......... *H02B 1/50* (2013.01); *F21W 2131/103* (2013.01)

(58) Field of Classification Search
CPC .............. E04H 12/2261; E04H 12/003; F21W 2131/103; H02G 3/14; H02G 9/10
USPC .................................. 49/211, 218, 219, 241
See application file for complete search history.

(56) References Cited

U.S. PATENT DOCUMENTS 1,645,645 A * 10/1927 Davis .................... E04H 12/003 116/173
1,667,828 A * 5/1928 Speer .................... E04H 12/003 220/324
3,198,296 A * 8/1965 Pfaff, Jr. ............ E04H 12/2261 52/296
3,343,322 A * 9/1967 Lurkis ................... E04H 12/003 362/431
3,369,331 A * 2/1968 Deskey ................. E04H 12/003 248/219.2
3,402,846 A * 9/1968 Zerwes ................ H01R 13/447 174/81
4,036,396 A * 7/1977 Kennedy ........... H01R 13/5213 174/67
4,154,037 A * 5/1979 Anderson ............... E01F 9/644 52/296
4,878,160 A * 10/1989 Reneau ................. E04H 12/003 362/269
5,228,584 A * 7/1993 Williams, Jr. ........... H02G 3/14 174/67
(Continued)

*Primary Examiner* — Bradley Duckworth
(74) *Attorney, Agent, or Firm* — King & Spalding LLP

(57) ABSTRACT

A streetlight mounting system can mount a streetlight pole to a street side surface, such as a slab of concrete or a sidewalk. The system can comprise a base that attaches on one end to the street side surface and on the other end to the streetlight pole. The base can comprise an enclosure having an opening and an associated door for providing access to an interior space of the enclosure. A hinge system can open and shut the door. When the door is shut, the hinge system can be contained within the interior space and thus hidden from view. When the door is open, the hinge system can elevate the door relative to the opening.

19 Claims, 9 Drawing Sheets

(56) References Cited

U.S. PATENT DOCUMENTS

| | | | | |
|---|---|---|---|---|
| 6,683,247 | B1 * | 1/2004 | McTavish | H02G 3/14<br>138/92 |
| 7,178,202 | B2 * | 2/2007 | Hirtsiefer | E05D 3/14<br>16/286 |
| 7,219,873 | B2 * | 5/2007 | Harwood | E04H 12/2261<br>181/171 |
| 7,690,613 | B2 * | 4/2010 | Bowman | H01F 27/02<br>248/346.01 |
| 8,904,709 | B2 * | 12/2014 | Ajiki | 312/319.2 |
| 9,188,317 | B1 * | 11/2015 | Bryant | F21V 21/00 |
| 2008/0314298 | A1 * | 12/2008 | McCarthy | H02G 3/10<br>109/64 |
| 2009/0154178 | A1 * | 6/2009 | Hall | E04H 12/003<br>362/431 |

* cited by examiner

STREETLIGHT BASE

CROSS REFERENCE TO RELATED APPLICATIONS

This application claims priority to U.S. Provisional Patent Application No. 61/828,927 filed May 30, 2013 in the name of Khurram Zeshan Moghal and entitled "Streetlight Base," the entire contents of which are hereby incorporated herein by reference.

FIELD OF THE TECHNOLOGY

The present technology relates to streetlights and more particularly to a base for a streetlight.

BACKGROUND

Streetlights are often positioned adjacent or above an area to be illuminated, such as a street, walkway, or other location. Utilizing conventional mounting approaches, such streetlights are often cumbersome or inefficient in terms of mounting and/or servicing. Conventional streetlight mounting systems frequently provide surface personnel with a less than desirable level of access to internal elements, such as mounting hardware and electrical systems.

Improved technology for mounting streetlights in needed. Need exists for an improved base for a streetlight. Need exists for an improved capability to access internal areas of the base and elements and components located inside the base. An improved door and improved door mechanisms are needed. Need exists for better security features. Further need exists for improvements in terms of reliability, economy, compactness, and visual appeal, so as not to detract from cityscapes, for example.

A capability addressing such need, or some other related deficiency in the art, would support economically providing illumination to streets and other areas.

SUMMARY

A base for a streetlight can comprise an enclosure that includes an aperture having a top and a bottom, a door disposed at the aperture, and a hinge system for opening and closing the door. The hinge system can be hidden from view when the door is closed. The hinge system can comprise an arm, a first hinge, and a second hinge. The arm can comprise a first end; a second end; and a member that extends between the first end and the second end and that comprises a crook, a dogleg, a curve, or an abrupt bend. The first hinge can be disposed within the enclosure, adjacent the top of the aperture, and can couple the first end of the arm to the enclosure. The second hinge can be disposed at an interior surface of the door and can couple the second end of the arm to the door.

In some embodiments, the hinge system further comprises a pair of apertures that are aligned when the door is open, that are misaligned when the door is closed, and that hold the door open with insertion of a pin. The hinge system can be spring loaded for automatic opening, automatic shutting, and/or automatic opening and shutting. In some embodiments, such a spring loaded hinge system can comprise a torsion spring disposed at the second hinge for automatically closing the door upon removal of the pin from the pair of apertures.

In some embodiments, the hinge system further comprises a second arm, a third hinge, and a fourth hinge. The second arm can comprise a third end, a fourth end, and a second member that extends between the third end and the fourth end and that comprises a second crook. The third hinge can be disposed within the enclosure, adjacent the top of the aperture, and can couple the third end of the second arm to the enclosure. The fourth hinge can be disposed at the interior surface of the door and can couple the fourth end of the second arm to the door.

In some embodiments, the streetlight base can further comprise a tamperproof fastener extending between the enclosure and the door for securing the door in a closed position.

In some embodiments, the hinge system can maintain the door at a higher elevation than the aperture when the door is fully open.

In some embodiments, one or more arms of the hinge system can be angled between about 70 degrees and about 110 degrees, or some other appropriate angle or angles.

In some embodiments, the bottom of the aperture can comprise a protrusion, and a bottom portion of the door can comprise a groove that engages the protrusion when the door is closed. Interaction between the protrusion and the groove can help secure the door and may support keeping the door closed with a single fastener, which may be tamperproof or tamper resistant in certain embodiments.

In some embodiments, the second end of the arm can comprise a cutout providing clearance to facilitate closing of the door.

In some embodiments, a feature on the second end of the arm and an associated boss or protrusion on an internal door surface can provide a failsafe for self-closing of the door.

The foregoing discussion of a streetlight base is for illustrative purposes only. Various aspects of the present technology may be more clearly understood and appreciated from a review of the following text and by reference to the associated drawings and the claims that follow. Other aspects, systems, methods, features, advantages, and objects of the present technology will become apparent to one with skill in the art upon examination of the following drawings and text. It is intended that all such aspects, systems, methods, features, advantages, and objects are to be included within this description and covered by this application and by the appended claims of the application.

Figure 1A:
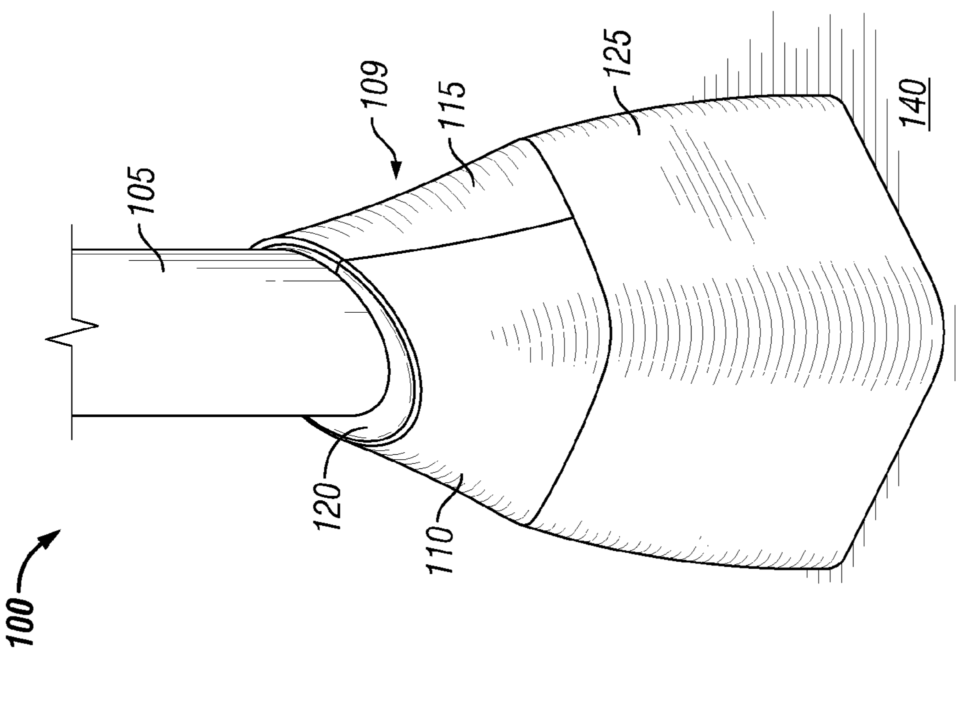
FIGS. 1A and 1B (collectively FIG. 1) illustrate a representative streetlight mounting system comprising a base, a collar, and a streetlight pole, in two views, according to some example embodiments of the present technology.

Many aspects of the technology can be better understood with reference to the above drawings. The elements and features shown in the drawings are not necessarily to scale, emphasis being placed upon clearly illustrating the principles of exemplary embodiments of the present technology. Moreover, certain dimensions may be exaggerated to help visually convey such principles.

DESCRIPTION OF EXAMPLE EMBODIMENTS

A streetlight base can securely mount a streetlight pole in a position adjacent a street or other area to be illuminated. One or more light sources attached to or integrated with the pole can emit light to provide illumination. The light sources may be based on high energy discharge technology, incandescent technology, light emitting diode technology, or some other appropriate light emission technology, for example. The streetlight pole can be mounted in an upright position. In certain embodiments, the streetlight pole can be mounted in a tilted orientation or mounted horizontally, for example.

The present technology can be embodied in many different forms and should not be construed as limited to the embodiments set forth herein; rather, these embodiments are provided so that this disclosure will be thorough and complete, and will fully convey the scope of the technology to those having ordinary skill in the art. Furthermore, all "examples," "embodiments," "example embodiments," or "exemplary embodiments" given herein are intended to be non-limiting and among others supported by representations of the present technology.

Technology for mounting streetlights will now be described more fully with reference FIGS. 1-6, which describe representative embodiments of the present technology and illustrate various elements and views of a representative streetlight mounting system.

Figure 1B:
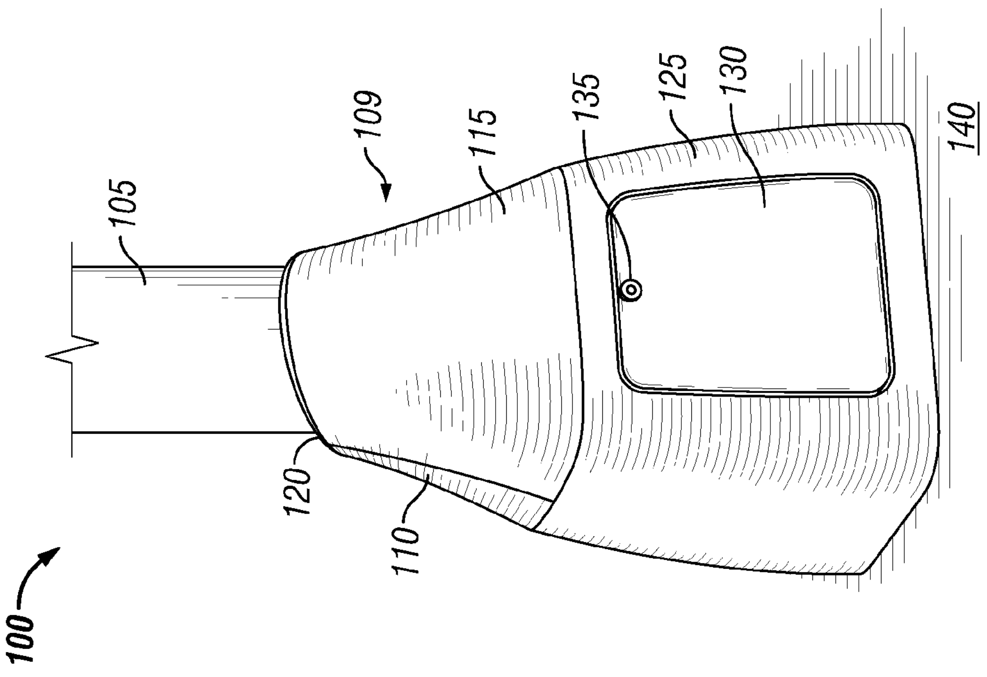

FIGS. 1A and 1B illustrate two views of a representative streetlight mounting system 100. The street light mounting system 100 comprises a base 125 that is fixed to a surface 140 near an area to be illuminated, a collar 109, and a streetlight pole 105.

The surface 140 to which the base 125 may be mounted may comprise a concrete slab, a sidewalk, or other suitable structure, for example.

The collar 109 comprises two collar sections 110, 115 that together circumscribe the pole 105. Other collar embodiments, may have three or four or some other appropriate number of collar sections. In some example embodiments, the collar 109 may be a unitary structure that seamlessly circumscribes the pole 105.

In some embodiments, the collar sections 110, 115 are formed of cast aluminum. However, other materials may be utilized singularly or in combination. In some embodiments, the collar sections 110, 115 are formed of plastic, fiberglass, or an appropriate composite material, for example.

In the illustrated embodiment, the uppermost portion 120 or top of the collar sections 110, 115 is angled to facilitate water shedding. In other words, the distal end of the collar 109 is oriented at an acute angle relative to the longitudinal axis of the streetlight pole 105. The resulting angle can promote runoff of rain water and/or help avoid excess accumulation of debris.

In a typical installation, the streetlight mounting system 100 can be oriented so that the uppermost portion 120 of the collar 109 is angled toward the street. In this orientation, runoff water tends to flow towards and ultimately into a gutter on the street.

A fastening system holds together the base 125, the collar sections 110, 115, and the pole 105. The fastening system is enclosed within the base 125 and collar 109 and hidden from external view, but accessible via a door 130 on the base 125. An example fastening system is described in U.S. Provisional Patent Application No. 61/828,939 filed May 30, 2013 in the name of Christopher Michael Bryant and Khurram Zeshan Moghal and entitled "Streetlight Mounting System," the entire contents of which are hereby incorporated herein by reference.

Maintaining the fastening system internal to the streetlight mounting system 100 avoids tampering and debris collection, helps keep the system compact, and further offers aesthetic benefit. As will be further discussed below, the door 130 opens and shuts via a hinge system that is hidden within the base 125. A fastener 135 holds the door 130 shut. In the illustrated embodiment a single fastener 135 is visible outside the base 125.

In some embodiments, the base 125 is cast from a metal such as aluminum or stainless steel that can withstand weather. In some embodiments, the base 125 may be made of galvanized steel. In some embodiments, the base 125 may comprise plastic, fiberglass, or an appropriate composite of materials.

In a typical installation, the streetlight mounting system 100 can be oriented so that the door 130 opens away from the street. This orientation facilitates access with the streetlight between the service personnel and the street. Opening the door 130 exposes an opening or aperture in the wall of the base 125, to provide access to the internal space of the base 125.

Referring now to FIG. 2, FIGS. 2A, 2B, 2C, and 2D illustrate progressively opening the door 130 of the streetlight base 125. The door 130 is fully closed in FIG. 2A and fully open in FIG. 2D.

Figure 2A:
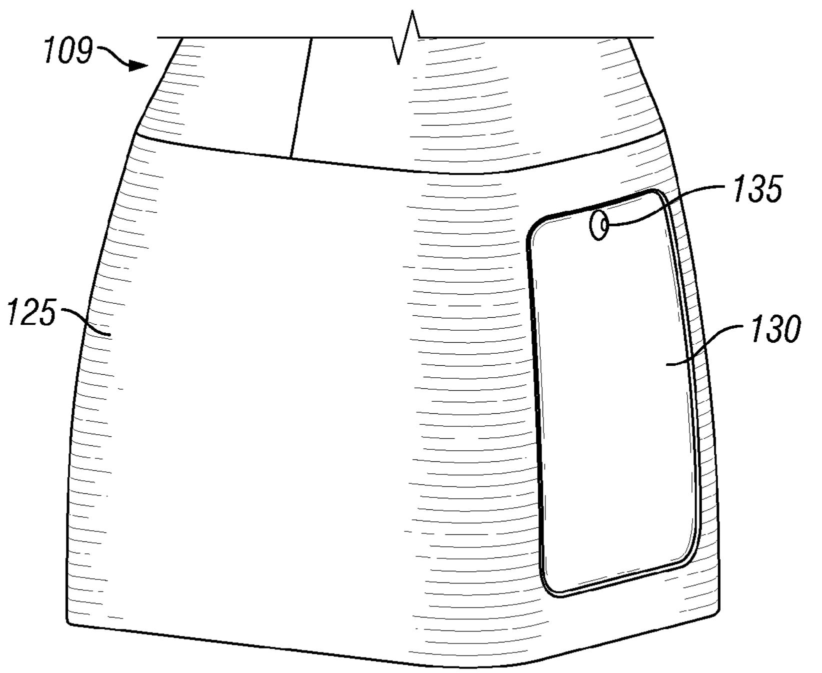
FIGS. 2A, 2B, 2C, and 2D (collectively FIG. 2) illustrate progressively opening a door of the streetlight base according to some example embodiments of the present technology.
Figure 2B:
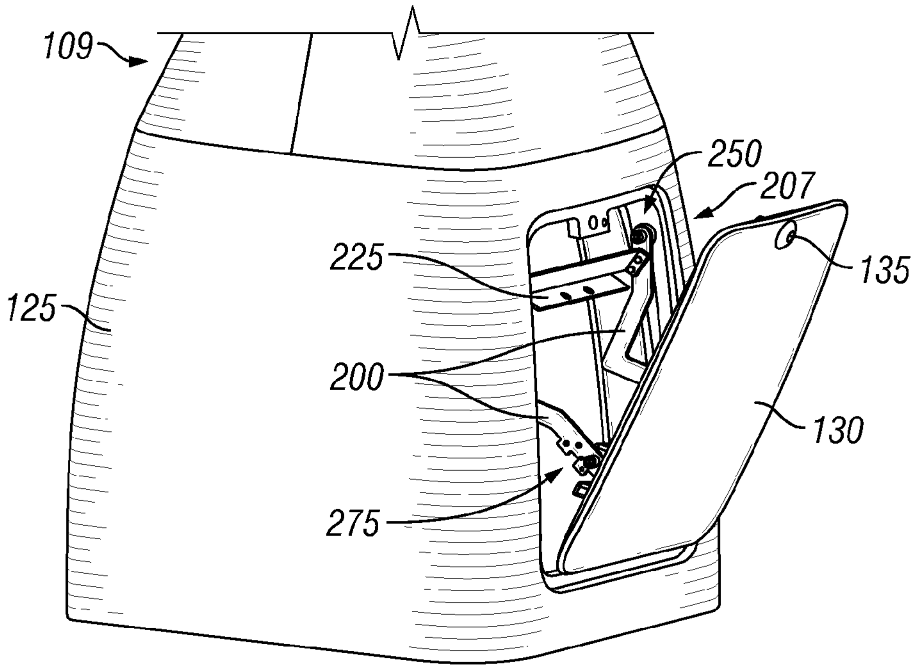
Figure 2C:
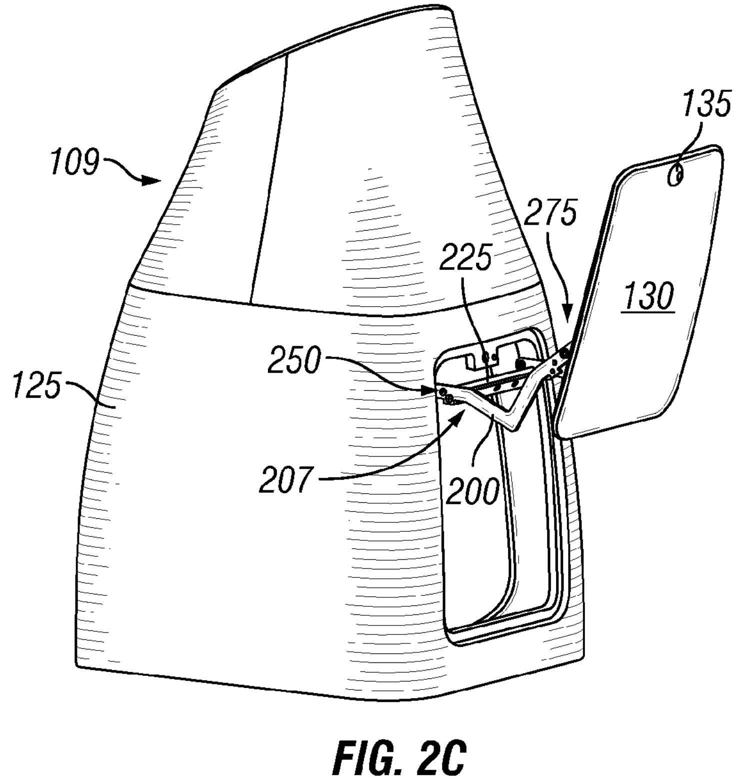
Figure 2D:
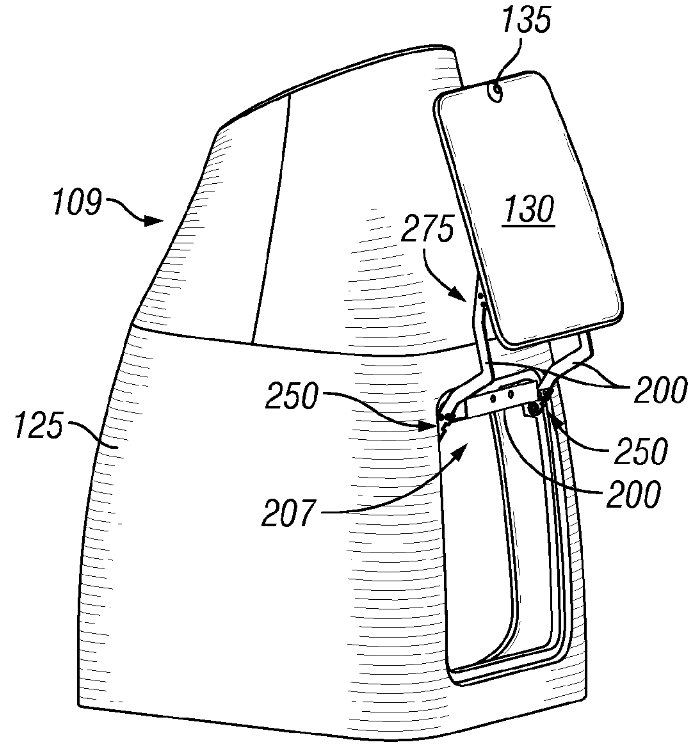

As illustrated in FIG. 2A, a tamperproof fastener 135 (which may also be characterized as tamper resistant) secures the door 130 to the base 125 when the door 130 is closed. For example, the fastener 135 may be a screw having a special head that requires a screwdriver with a special bit for removal. As illustrated in FIG. 2D, a hinge system 207 elevates the door 130 above the opening when the door 130 is fully opened, thereby promoting a high level of access for installation or other service. With the door 130 elevated fully above the opening, the door 130 is fully open so that an installer can readily get inside the enclosure and wire efficiently.

Figure 3A:
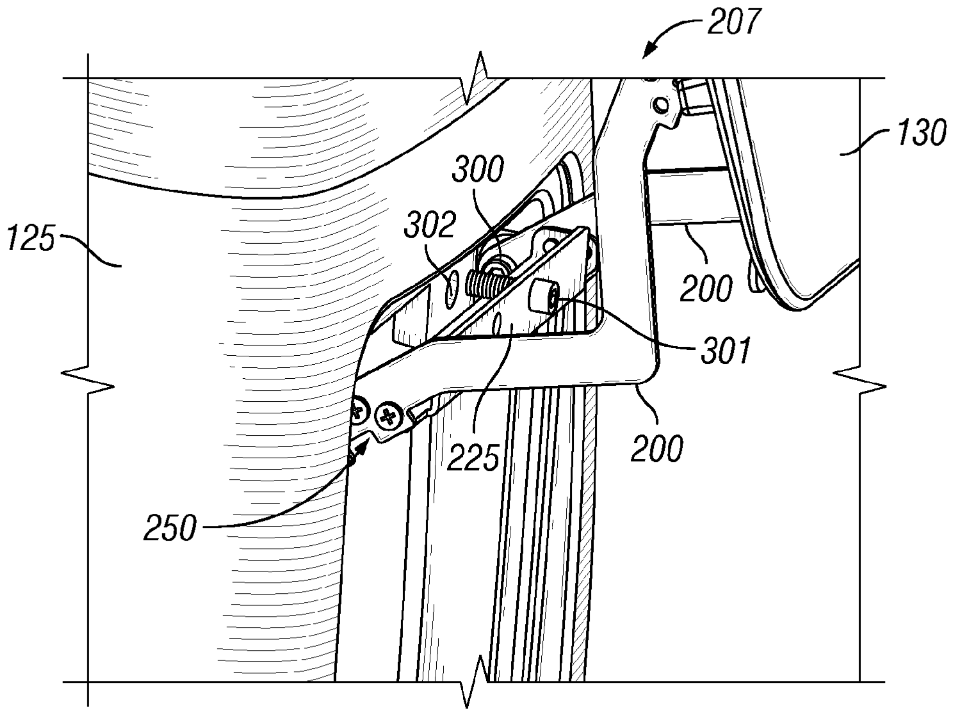
FIGS. 3A and 3B (collectively FIG. 3) illustrate a hinge system for the door of the streetlight base, showing a kickstand feature that maintains the door open to facilitate service, according to some example embodiments of the present technology.
Figure 3B:
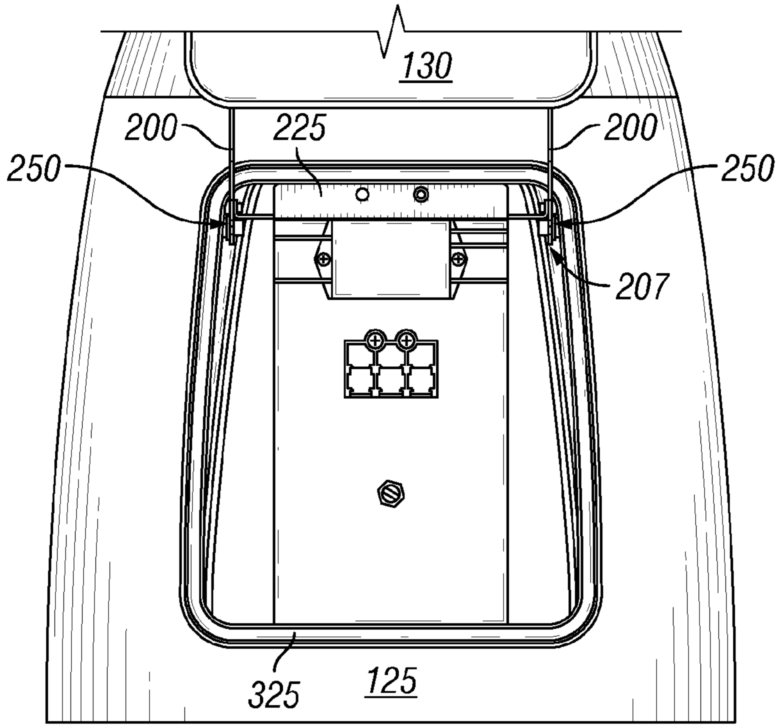

FIGS. 3A and 3B illustrate in further detail the hinge system 207 for the door 130 of the streetlight base. The hinge system 207 includes two arms 200 that couple the door 130 to the base 125. Each arm 200 has two associated hinges 250, 275. One hinge 250 connects the base end of the arm 200 to the base 125. The other hinge 275 connects the door end of the arm 200 to the door 130. Between the two ends, each arm 200 is crooked to promote opening widely, facilitating service access. As illustrated, the crook may be characterized as a dogleg, an abrupt bend, or as a curve. In some embodiments, the crook comprises an angle in a range from approximately 70 degrees to approximately 110 degrees. However, other crook embodiments may have different angles and may be sharper or more gradual or have multiple bends or corners. In some embodiments, the crooked arm is arched or is shaped to follow a circumference of a circle.

In some example embodiments, the arm 200 is bent by at least approximately 30 degrees, i.e. so the arm 200 deviates from straight by at least approximately 30 degrees. In some example embodiments, the arm 200 is bent by at least approximately 45 degrees. In some example embodiments, the arm 200 is bent by at least approximately 60 degrees. In some example embodiments, the arm 200 is bent by at least approximately 75 degrees. In some example embodiments, the arm 200 is bent by at least approximately 90 degrees. In some example embodiments, the arm 200 is bent by at least approximately 115 degrees. In some example embodiments, the arm 200 is bent in a range between any two of the degree values in this paragraph. As these values are examples, other embodiments may have different bends and various applications may benefit from different bends.

In some embodiments, the arms 200 are formed from fiberglass or plastic. In other embodiments, the arms 200 are formed of aluminum, stainless steel, or another appropriate metal. In some embodiments, the arms 200 comprise one or more composite materials.

In addition to the arms 200, the illustrated hinge system 207 includes a kickstand capability for maintaining the door 130 open to facilitate service. In support of such a capability, a bracket 225 extends between the two arms 200 so that the arms 200 operate in unison. When the door 130 is open, a hole or aperture 301 in the bracket 225 aligns with a corresponding hole or aperture 302 in the base 125. Placing a pin 300 in the two holes 301, 302 maintains the door 130 in the wide open position. In the illustrated embodiment, a screw serves as the pin 300. While the illustrated screw has threads, threads are not required for the illustrated embodiment. A screwdriver blade or other member may be utilized as the pin 300, for example.

Figure 4A:
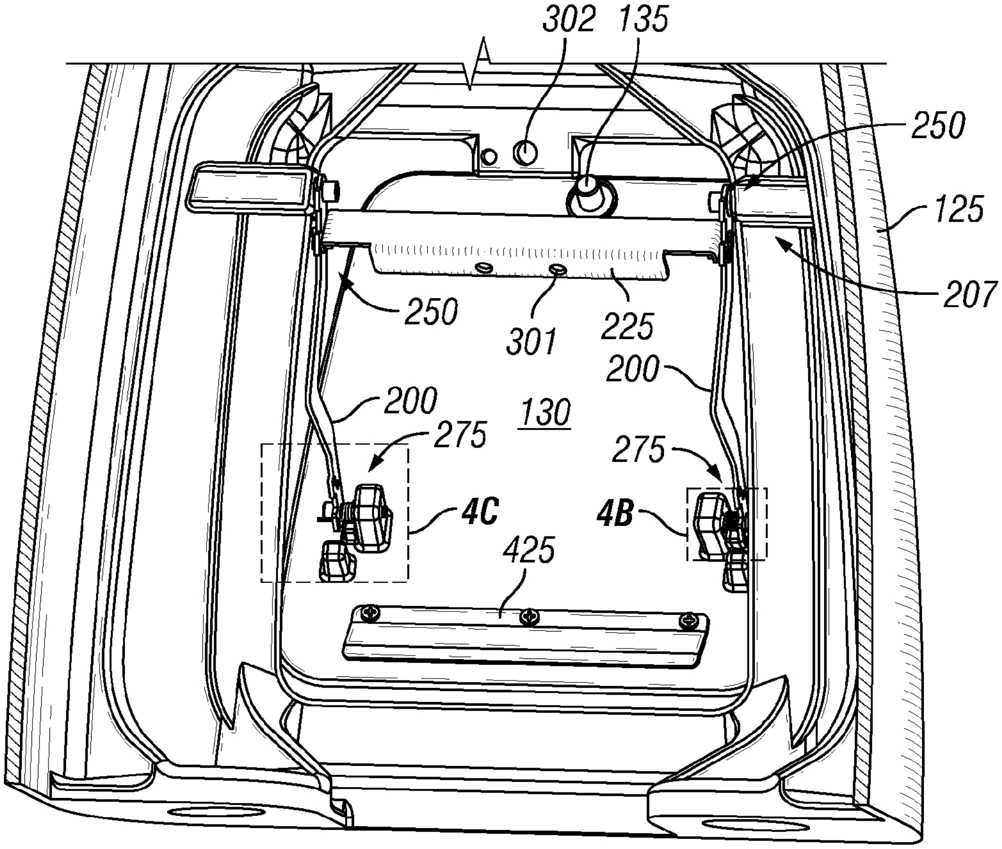
FIGS. 4A, 4B, 4C, and 4D (collectively FIG. 4) further illustrate the hinge system for the door of the streetlight base, showing torsion springs for automatically closing the door upon release of the kickstand feature according to some example embodiments of the present technology.
Figure 4B:
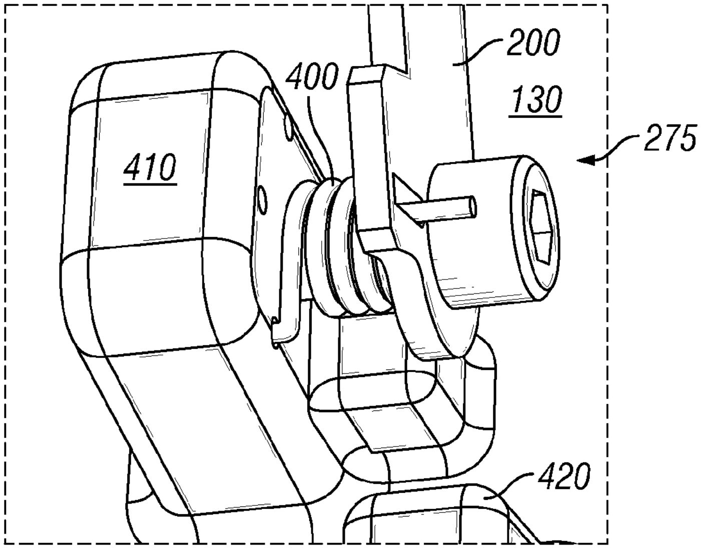
Figure 4C:
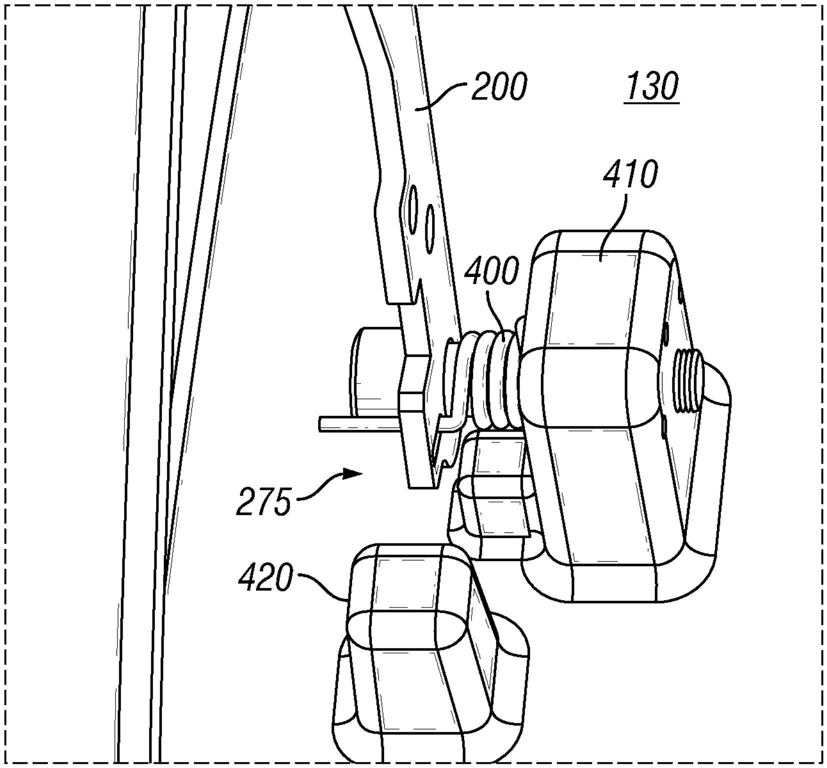
Figure 4D:
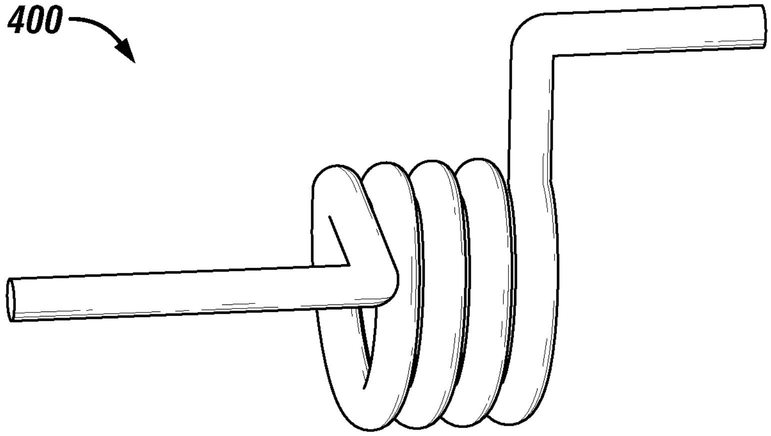

As shown in FIGS. 4A, 4B, 4C, and 4D the illustrated hinge system 207 includes torsion springs 400 for automatically closing the door 130 upon release of the kickstand feature as discussed above. FIG. 4A illustrates the interior side of the door 130 with a perspective from inside the base 125. FIG. 4B provides a detail view of the hinge 275 on the right hand side of FIG. 4A. FIG. 4C provides a detail view of the hinge 275 on the left hand side of FIG. 4A. FIG. 4D provides a detail view of the torsion spring 400. In some example embodiments, the torsion springs 400 may be formed of spring stainless steel to avoid rust associated with moisture or road salt.

In the illustrated embodiment, each hinge 275 pivots about an axle that extends from a boss 410 on the inside of the door 130. Each torsion spring 400 is fixed on one side to the boss 410 and on the other side to the arm 200. In operation, in the illustrated embodiment, the torsion springs 400 exert sufficient torque at the door-side hinges 275 to close the door 130 when the pin 300 is removed. As will be discussed below with reference to FIG. 6, an adjacent boss 420 provides a door closing failsafe.

In the illustrated embodiment, the door 130 opens manually and can close automatically via torsion spring action. The torsion springs 400, bracket 225, arms 200, and gravity help shut the door 130. When the door 130 is in a closed state, the torsion springs 400 are at rest, but still engaged in small torsion force. Once the door 130 starts to open, the torsion springs 400 further engage and torsion force begins to increase. When the door 130 is in full open state, the torsion springs 400 are in full torsion. Once the door 130 is released from the fully opened position, the springs 400 start to work back to their initial, rest state, hence closing the door 130. The bracket 225 and arms 200, along with gravity, restrict the door motion and aid in closing the door 130 in the same motion as it opened.

Figure 5A:
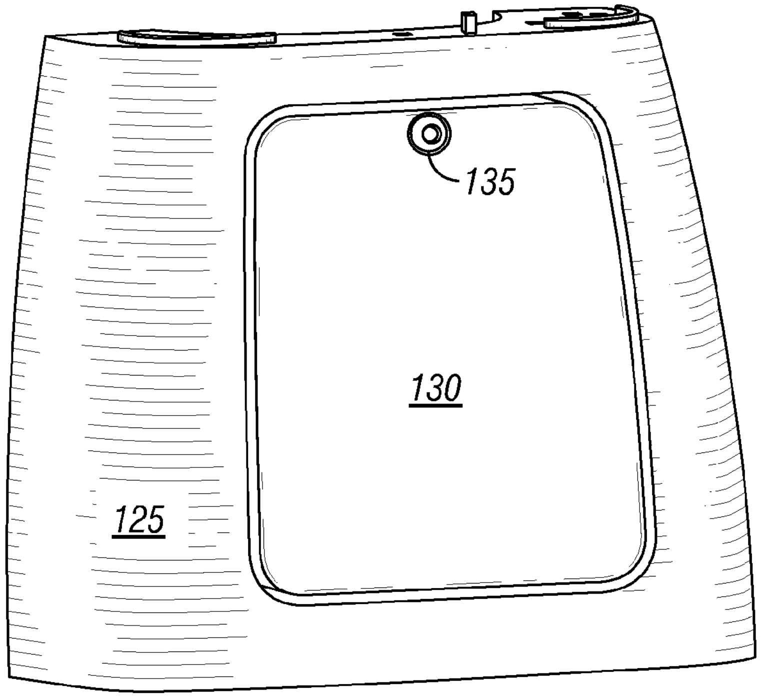
FIGS. 5A, 5B, and 5C (collectively FIG. 5) provide additional views of the streetlight base and the hinge system according to some example embodiments of the present technology.
Figure 5B:
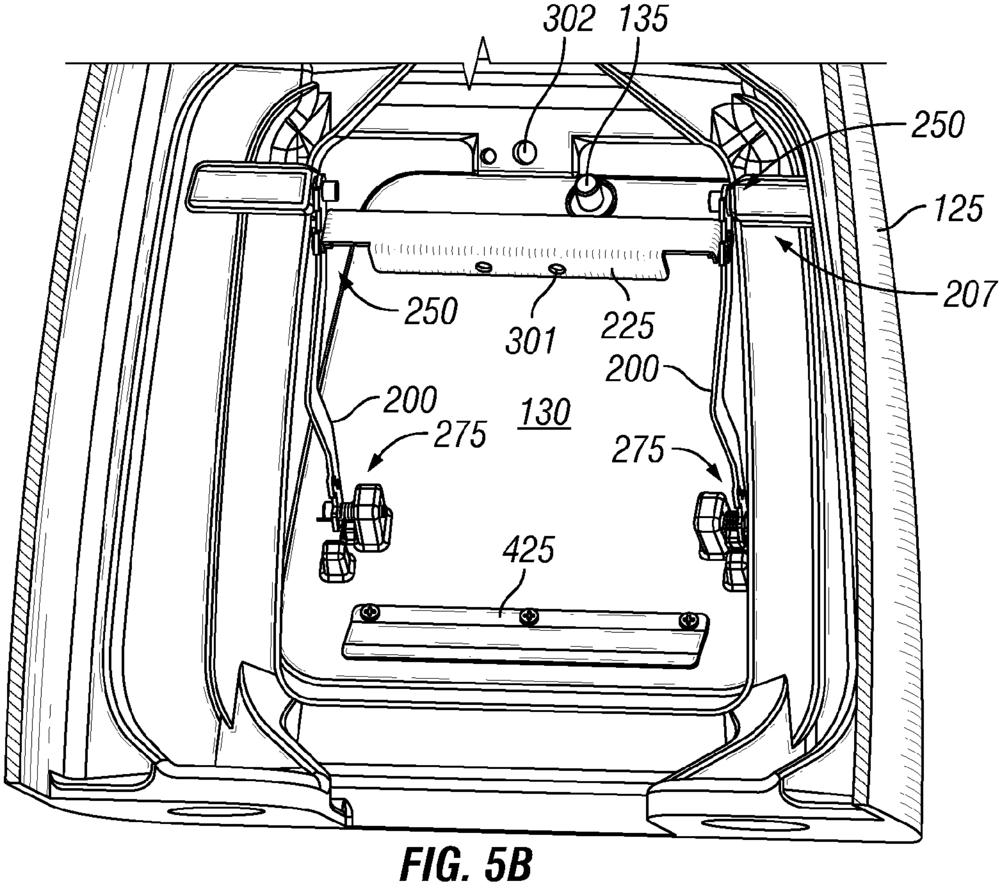
Figure 5C:
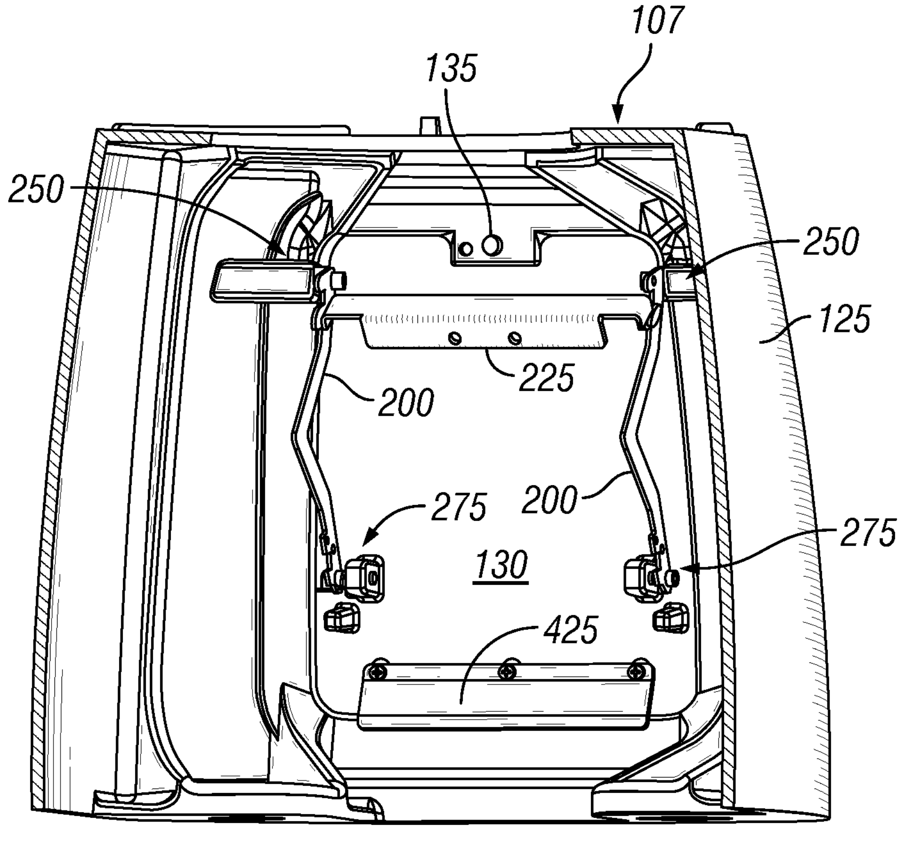

Referring now to FIG. 5, FIGS. 5A, 5B, and 5C provide additional views of the streetlight base 125 and the hinge system 207. FIG. 5A illustrates an external view of the base 125. FIG. 5B illustrates the door 130 partially open as viewed from an observation point within the base 125. FIG. 5C illustrates the door 130 closed as viewed from an observation point within the base 125. As shown in FIGS. 5A, 5B, and 5C, the hinge system 207 is fully enclosed within the base 125 when the door 130 is closed, and thus is hidden from view and protected from tampering, inadvertent damage, and weathering.

Figure 6B:
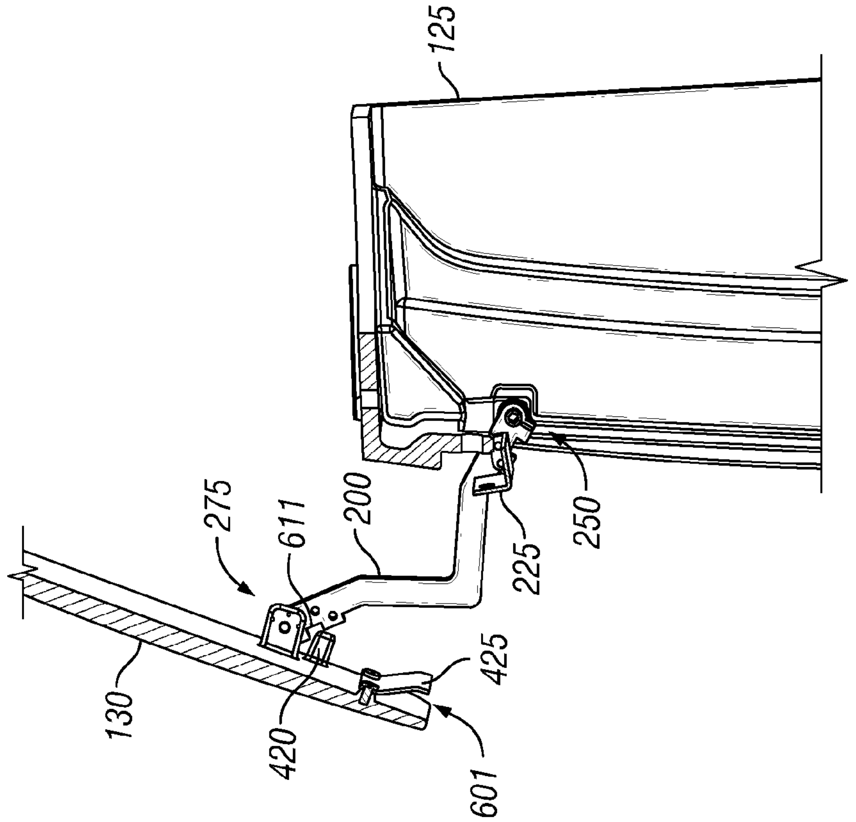
FIGS. 6A and 6B (collectively FIG. 6) illustrate cross sectional views of the hinge system with the door in shut and open positions according to some example embodiments of the present technology.
Figure 6A:
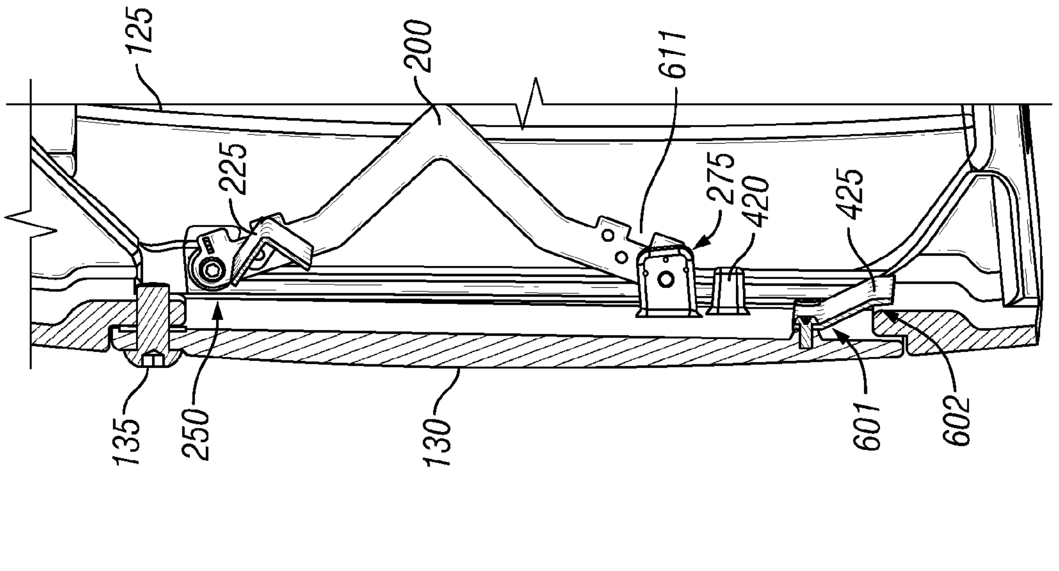

Referring now to FIG. 6, FIGS. 6A and 6B illustrate cross sectional views of the hinge system 207 with the door 130 in shut and open positions respectively. As illustrated in FIG. 6A, a bracket 425 at the bottom of the door 130 provides a groove 601 that engages with a lip or protrusion 602 at the bottom of the opening in the base 125 in order to help keep the door 130 securely shut. In the illustrated embodiment, the bracket 425 comprises a strip that extends horizontally, resulting in a horizontally extending groove 601. This feature facilitates securing the door 130 in a closed position with a single screw 135.

As illustrated in FIG. 6B, the ends of the arms 200 that are adjacent the door 130 include features in the form of cutouts 611, and associated bosses 420 protrude from the interior surface of the door 130. The bosses 420 and the cutouts 611 provide a door-closing failsafe that helps avoid any jamming or sticking of the door 130 during closing resulting from unwanted interference. The bosses 420 purposely interfere with the cutouts 611 when the door 130 is in full open position. The result is that the door 130 assumes a position that avoids jamming during door closure. Accordingly, the bosses 420 keep the door 130 from opening too far and swinging out of position, where there may be possible jamming when the door 130 is closing. Thus, the failsafe feature helps maintain alignment of the hinge system 207 and facilitates self-closing of the door 130 from torsion spring force.

While the figures depict one example embodiment of a door opening and closing system, numerous other embodiments are supported, and the illustrated embodiment can be adapted by those of skill in the art having benefit of the teaching provided herein. One such example variation will now be described, without limitation.

This embodiment is configured so that the torsion springs 400 are manufactured to a common specification. That is, the torsion springs 400 may have the same part number or are interchangeable, rather than being mirror images of one another. To achieve this design, both hinges 275 are configured as illustrated in FIG. 4C. In other words, both arms 200 are disposed on the left of their respective bosses 410, rather than one on the right and one on the left as respectively illustrated in FIGS. 4B and 4C. And, the upper end of the arm 200 on the right is bent to the right in order to reach its upper hinge 250. That is, the upper end of the arm 200 on the right extends straight, jogs to the right, and then extends straight to achieve an arm-to-arm separation at the bracket 225 and the upper hinges 250 as illustrated in FIG. 4A. In addition to the bracket 225, a second bracket can extend between the lower ends of the two arms 200, thereby providing additional structural support. In other words, two brackets can extend arm-to-arm, one at the base end (as illustrated) and another at the door end.

Technology for a streetlight base has been described. From the description, it will be appreciated that embodiments of the present technology overcome limitations of the prior art. Those skilled in the art will appreciate that the present technology is not limited to any specifically discussed application or implementation and that the embodiments described herein are illustrative and not restrictive. From the description of the exemplary embodiments, equivalents of the elements shown therein will suggest themselves to those skilled in the art, and ways of constructing other embodiments of the present technology will appear to practitioners of the art.

What is claimed is:

1. A streetlight base comprising:
- an enclosure comprising an aperture, the aperture comprising a top and a bottom;
- a door disposed at the aperture;
- a hinge system for opening and closing the door, the hinge system comprising:
  - an arm comprising:
    - a first end;
    - a second end; and
    - a member that extends between the first end and the second end and that comprises a crook;
  - a first hinge disposed within the enclosure, adjacent the top of the aperture, the first hinge coupling the first end of the arm to the enclosure; and
  - a second hinge disposed at an interior surface of the door and coupling the second end of the arm to the door; and
- a pair of apertures that are aligned when the door is open, that are misaligned when the door is closed, and that hold the door open with insertion of a pin.

2. The streetlight base of claim 1, wherein the hinge system further comprises a second arm and a member that extends between the arm and the second arm and that comprises one of the apertures.

3. The streetlight system of claim 2, wherein the hinge system further comprises a torsion spring disposed at the second hinge for automatically closing the door upon removal of the pin from the pair of apertures.

4. The streetlight base of claim 1, wherein the hinge system further comprises:
- a second arm comprising:
  - a third end;
  - a fourth end; and
  - a second member that extends between the third end and the fourth end and that comprises a second crook;
- a third hinge disposed within the enclosure, adjacent the top of the aperture, the third hinge coupling the third end of the second arm to the enclosure; and
- a fourth hinge disposed at the interior surface of the door and coupling the fourth end of the second arm to the door.

5. The streetlight base of claim 1, further comprising a tamperproof fastener extending between the enclosure and the door for securing the door in a closed position.

6. The streetlight base of claim 1, wherein the hinge system positions the door at a higher elevation than the aperture when the door is fully open.

7. The streetlight base of claim 1, wherein the crook comprises a dogleg.

8. The streetlight base of claim 1, wherein the crook comprises an angle of between about 70 and about 110 degrees.

9. The streetlight base of claim 1, wherein the bottom of the aperture comprises a protrusion, and
- wherein a bottom portion of the door comprises a groove that engages the protrusion when the door is closed.

10. The streetlight base of claim 1, wherein the second end of the arm comprises a cutout.

11. The streetlight base of claim 1, wherein the hinge system is hidden within the enclosure when the door is closed.

12. The streetlight base of claim 1, wherein the arm comprises a protruding feature and the interior surface of the door comprises a boss.

13. A streetlight base comprising:
- an enclosure comprising an aperture, the aperture comprising an upper side;
- a door disposed at the aperture; and
- a hinge system operable to expose the aperture by elevating the door relative to the upper side of the aperture, the hinge system comprising:
  - a pair of apertures that are aligned when the door is open, that are misaligned when the door is closed, and that hold the door open when a member is inserted into the pair of apertures.

14. The streetlight base of claim 13, wherein the hinge system is disposed fully within the enclosure when the door is closed, and
- wherein the hinge system further comprises:
  - two arms; and
  - a second member that extends between the two arms and that comprises one of the apertures.

15. The streetlight base of claim 13, wherein the hinge system further comprises:
- a first member comprising:
  - a first end attached to an interior surface of the door via a first hinge;
  - a second end attached to an interior surface of the enclosure via a second hinge; and
  - a first abrupt bend disposed between the first end and the second end;
- a second member comprising:
  - a third end attached to the interior surface of the door via a third hinge;
  - a fourth end attached to the interior surface of the enclosure via a fourth hinge; and
  - a second abrupt bend disposed between the first end and the second end; and
- a third member that extends between the first member and the second member and that comprises at least one aperture of the pair of apertures.

16. The streetlight base of claim 13, wherein the hinge system further comprises a torsion spring that is operable to close the door automatically upon removal of the member from the pair of apertures.

17. A streetlight base comprising:
- an enclosure comprising:
  - one or more walls defining an interior space; and
  - an aperture in the one or more walls that provides access to the interior space;
- a door that covers the aperture when the door is closed and that exposes the aperture to provide access to the interior space when the door is open; and
- a hinge system that is operable to move the door between closed and open, the hinge system disposed in the interior space when the door is closed, wherein the hinge system comprises:

a plurality of arms, each arm comprising:

a first end attached to an interior side of the door via a first hinge, with a torsion spring operably coupled to the first hinge;

a second end attached to the enclosure via a second hinge; and a bend disposed between the first end and the second end; and a member extending between two arms in the plurality of arms, the member comprising a first aperture that is aligned with a second aperture of the streetlight base when the door is open and that is out of alignment with the second aperture when the door is closed.

18. The streetlight base of claim 17, wherein moving the door between closed and open comprises elevating the door relative to the aperture.

19. The streetlight base of claim 17, wherein the hinge system is spring loaded to close the door automatically.

* * * * *